April 1, 1952 E. F. KINNEY ET AL 2,591,554
MECHANICAL WILD FOWL DECOY
Filed Nov. 17, 1950 2 SHEETS—SHEET 1
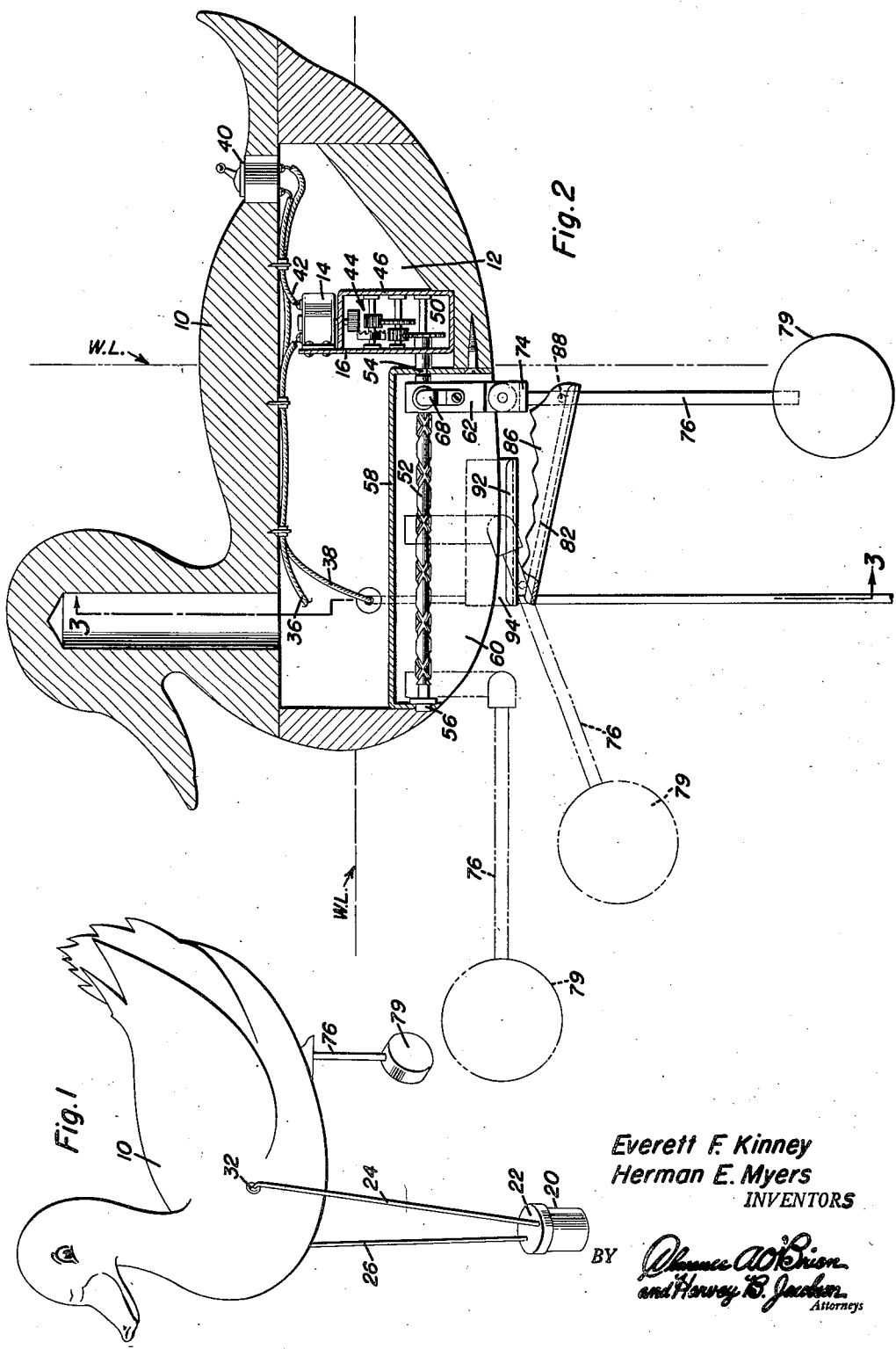
Everett F. Kinney
Herman E. Myers
INVENTORS April 1, 1952  E. F. KINNEY ET AL  2,591,554
MECHANICAL WILD FOWL DECOY
Filed Nov. 17, 1950  2 SHEETS—SHEET 2
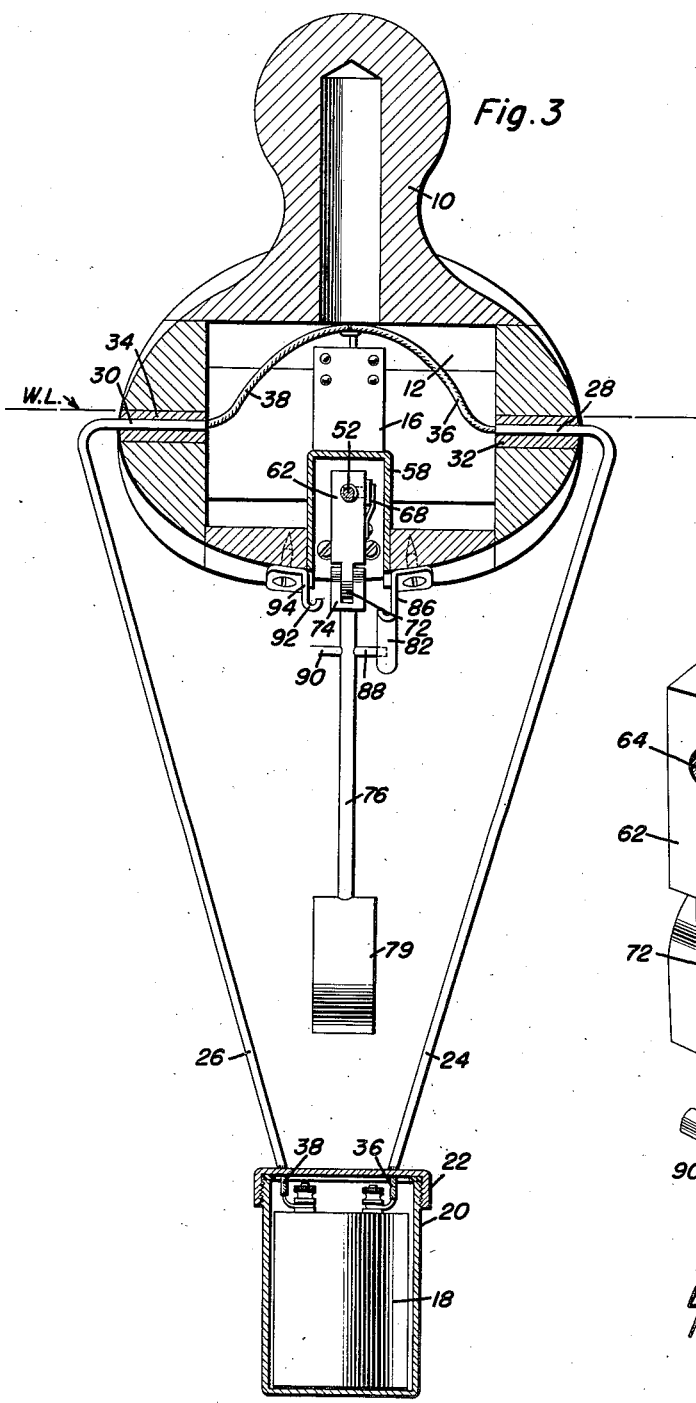
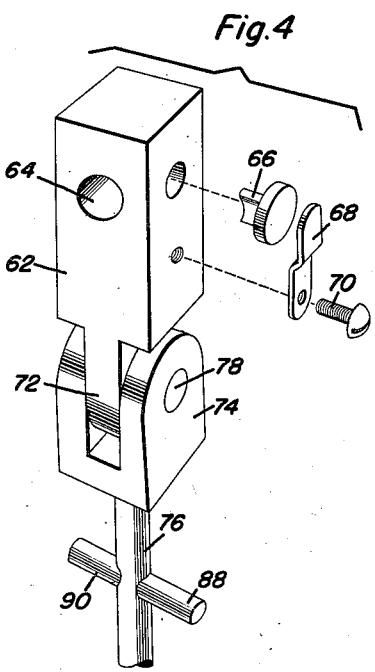
Everett F. Kinney
Herman E. Myers
INVENTORS Patented Apr. 1, 1952

2,591,554

UNITED STATES PATENT OFFICE 2,591,554

MECHANICAL WILD FOWL DECOY

Everett F. Kinney, Cambria, and Herman E. Myers, Milwaukee, Wis.

Application November 17, 1950, Serial No. 196,272

7 Claims. (Cl. 43—3)

This invention relates to improvements in devices adapted to be used by hunters for luring fowl.

An object of this invention is to provide an improved decoy capable by means of structure carried thereby, to preform a series of operations, the series consisting of diving motions made possible by shifting the center of gravity of the decoy to the front thereof and then moving it rearwardly and then again shifting it to the front and then again moving it rearwardly, this operation being continued indefinitely.

Ancillary objects and features of importance will become apparent in following the description of the illustrated form of the invention.

In the drawings:

Figure 1 is a perspective view of the device;

Figure 2 is a longitudinal sectional view of the device in Figure 1;

Figure 3 is a transverse view taken substantially on the line 3—3 of Figure 2 and in the direction of the arrows; and, Figure 4 is an exploded perspective view of a part of the means of causing the decoy to dive periodically.

In carrying out this invention there is provided what looks to be an ordinary decoy body 10, in this instance simulating a duck. The body is made of non-corrosive material and of course, buoyant material. There is a cavity 12 in the decoy body 10 supporting various structual elements so made as to cause the front part of the decoy to dive periodically and with regularity. In this instance there is an electric motor 14 provided on a hanger 16 which is fixed to the walls of the cavity. However, in lieu of the electric motor 14, a mechanical motor of the spring type may be substituted. With the electrical embodiment however, there are certain structural elements necessary which are not employed with the mechanical adaptation.

Reference is made to the battery 18 in the battery box 20 which is screwed to its cover 22, the cover being supported by means of arms 24 and 26 with trunnions 28 and 30 formed at their outer ends. These trunnions are mounted in bearings 32 and 34 which are disposed in the body 10 and which open inwardly of the cavity 12. Wires 36 and 38 extend from the terminals of the battery 18, one wire being attached to the motor 14 and the other wire being connected appropriately to the toggle switch 40 which is carried by the body 10. A lead wire 42 extends from another terminal of the motor 14 to the switch 40 whereby upon actuation of the switch the motor 14 is rendered operative.

A gear type transmission generally indicated at 44 and disposed in a gear case 46 is operatively connected with the motor shaft. This transmission has an output shaft 50 connected to the reverse threaded screw 52 which is mounted for rotation in the bearing openings 54 and 56 of a case 58 which closes the bottom of the cavity 12 and which defines a downwardly opening chamber 60 in the decoy body 10.

This downwardly opening chamber has a traveler block 62 disposed therein (Figure 4) and on the screw 52 which is passed through the bore 64 in the block 62. A leg 66 is carried by the block 62 and has its inner end in engagement with the grooves defining the thread on the double-threaded screw 52. Yielding means, preferably the spring arm 68, is attached to the block 62 by means of the screw 70 in order to yieldingly press the leg 66 into engagement with the threads of the screw 52.

Accordingly, when the screw 52 is rotated, in either one direction or the other, the traveling block 62 will move axially of the screw to one end thereof which is the position for the block to reverse its axial motion, whence the traveling block will return. This axial movement will continue so long as the screw 52 is rotated.

A tongue 72 depends from the block 62 and is disposed in the bifurcations 74 of pendulous or swinging arm 76. A pivot pin 78 connects the bifurcations to the tongue 72 thereby pivotally or swingingly mounting the arm 76. A weight 79 is disposed at the lower end of the arm 76 and is normally located below the water line of the decoy when the decoy is disposed in the water.

A track 82 is formed at the lower end of a bracket 86, the latter bracket being fixed to the bottom surface of the body 10. This track is inclined at an angle with respect to the horizontal and is adapted to accommodate the pin 88, carried by the arm 76, thereby causing the swinging arm 76 and weight 79 to be lifted, as shown in phantom in Figure 2, in response to rotation of the screw 52 which moves the block 62 forward thereon. The track 82 and pin 88 serve as a cam assembly for this arm lifting movement. However, while the weight 79 is being lifted, the center of gravity of the body 10 is continually shifting forward thereby causing the front part of the simulated duck to simulate a dive into the water.

As the block 62 approaches the forward end of its travel on the screw 52, the pin 88 slides off the forward end of the track 82. But, located above the track 82 is a bracket 94 having a track 92, said bracket 94 being fixed to the bottom of the body 10. The track 92 is substantially horizontal. When the block 62 moves rearwardly, the pin 90 which is fixed to the arm 76 extending from a side thereof opposite from the pin 88, engages the track 92 because the decoy has been moved in a substantially vertical position due to the movement of the arm 76. Inasmuch as the track 92 is horizontal, the arm 76 is held parallel to the screw by engagement of the pin 90 with the track 92.

When the block 62 has moved rearwardly a sufficient amount for the pin 90 to drop from the bracket 92, the pin 88 falls upon the track 82. At this time the swinging arm has moved rearwardly and with the dropping of the pin 90 out of the track 92 and the pin 88 upon the track 82, the body 10 will again assume a substantially horizontal position in the water because the center of gravity has moved backwardly with respect to the body 10.

Having described the invention, what is claimed as new is:

1. A decoy comprising a body, a motor mounted in said body, a double threaded screw mounted for rotation in said body and operatively connected to said motor, a traveling block disposed on said screw and adapted to move axially on said screw from one limit thereon to another limit thereon, a swinging arm carried by said block and having a weight carried thereby, and means operatively connected with said swinging arm and with said body to lift said swinging arms in response to movement of said block on said screw thereby shifting the center of gravity of said body to cause the body to move in the water.

2. A decoy comprising a body, a motor mounted in said body, a double threaded screw mounted for rotation in said body and operatively connected to said motor, a traveling block disposed on said screw and adapted to move axially on said screw from one limit thereon to another limit thereon, a swinging arm carried by said block and having a weight carried thereby, means operatively connected with said swinging arm and with said body to lift said swinging arm in response to movement of said block on said screw thereby shifting the center of gravity of said body to cause the body to move in the water, said last mentioned means comprising a pin connected to said arm, and a track secured to said body and having said pin in engagement therewith to actuate said swinging arm as it moves with said block.

3. The combination of claim 2 and said last mentioned means also including a second pin carried by said arm, a second cam track carried by said body and disposed on said second track when said block reaches one of said limits.

4. The combination of claim 3 and said second track being disposed in advance of the first mentioned track and arranged therebelow whereby when said block moves sufficiently to separate the second pin from said second track the first mentioned pin falls upon said first mentioned track.

5. In a decoy having a decoy body, a motor carried by said body, a double threaded screw driven thereby, a traveling block engaging said screw, an arm carried by said block and having a weight secured thereto whereby when said block is moved axially of said screw and on said screw the center of gravity of said body is shifted.

6. In a decoy having a decoy body, a motor carried by said body, a double threaded screw driven thereby, a traveling block engaging said screw, a pendulous arm pivotally carried by said block and having a weight secured thereto whereby when said block is moved axially of said screw and on said screw the center of gravity of said body is shifted, and means connected to said body and operatively connected with said arm for lifting said pendulous arm so that the weight is carried to an elevated position.

7. In a decoy having a decoy body, a motor carried by said body, a double threaded screw driven thereby, a traveling block engaging said screw, a pendulous arm pivotally carried by said block and having a weight secured thereto whereby when said block is moved axially of said screw and on said screw the center of gravity of said body is shifted, means connected to said body and operatively connected with said arm for lifting said pendulous arm so that the weight is carred to an elevated position, and means for holding said weight in the elevated condition until said block reaches a predetermined place on said screw.

EVERETT F. KINNEY.
HERMAN E. MYERS.

REFERENCES CITED

The following references are of record in the file of this patent:

UNITED STATES PATENTS

| Number | Name | Date |
|---|---|---|
| 2,434,335 | Signalness | Jan. 13, 1948 |